United States Patent
Weinstein et al.

(10) Patent No.: US 8,289,179 B2
(45) Date of Patent: Oct. 16, 2012

(54) VIBRATORY FLOW METER AND METHOD FOR CORRECTING FOR ENTRAINED GAS IN A FLOW MATERIAL

(75) Inventors: Joel Weinstein, Boulder, CO (US); Mark James Bell, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 514 days.

(21) Appl. No.: 12/598,858

(22) PCT Filed: May 25, 2007

(86) PCT No.: PCT/US2007/069737
§ 371 (c)(1),
(2), (4) Date: Nov. 4, 2009

(87) PCT Pub. No.: WO2008/147408
PCT Pub. Date: Dec. 4, 2008

(65) Prior Publication Data
US 2010/0134304 A1    Jun. 3, 2010

(51) Int. Cl.
*G08B 17/10* (2006.01)
(52) U.S. Cl. ..... 340/632; 340/606; 340/607; 73/861.18; 702/45; 702/56
(58) Field of Classification Search ............ 340/632, 340/603, 606, 607, 609, 610; 73/861, 357, 73/861.18, 861.41, 861.351, 861.355; 700/283; 702/45, 48, 56
See application file for complete search history.

(56) References Cited

U.S. PATENT DOCUMENTS

| | | | |
|---|---|---|---|
| 4,689,986 A | 9/1987 | Carson et al. | |
| 6,142,008 A | 11/2000 | Cole et al. | |
| 6,327,914 B1 | 12/2001 | Dutton | |
| 6,917,887 B2 * | 7/2005 | Henry et al. | 702/45 |
| 7,404,336 B2 * | 7/2008 | Henry et al. | 73/861.356 |
| 7,571,062 B2 * | 8/2009 | Henry et al. | 702/45 |
| 8,000,906 B2 * | 8/2011 | Henry et al. | 702/45 |

(Continued)

FOREIGN PATENT DOCUMENTS
JP     2003185554     7/2003
(Continued)

OTHER PUBLICATIONS

Reizner, J.R.: "Coriolis—The almost perfect flow meter", Computing & Control Enginering Journal., vol. 14, No. 4 Aug. 2003-Sep. 2003 pp. 28-33, XP0024564277 p. 30-p. 31.

(Continued)

*Primary Examiner* — Toan N Pham
(74) *Attorney, Agent, or Firm* — The Ollila Law Group LLC (57) ABSTRACT

A vibratory flow meter (100) for correcting for entrained gas in a flow material is provided. The vibratory flow meter (100) comprises a flow meter assembly (10) configured to generate a vibrational response for the flow material, a bubble size sensor (50) configured to generate a bubble measurement signal for the flow material, and meter electronics (20) coupled to the flow meter assembly (10) and to the bubble size sensor (50). The meter electronics (20) is configured to receive the vibrational response and the bubble measurement signal, determine a bubble size of bubbles in the flow material using at least the bubble measurement signal, determine one or more flow characteristics of the flow material using at least the vibrational response and the bubble size.

40 Claims, 9 Drawing Sheets

U.S. PATENT DOCUMENTS

| | | |
|---|---|---|
| 2004/0194539 A1 | 10/2004 | Gysling |
| 2005/0044929 A1 | 3/2005 | Gysling et al. |
| 2006/0048583 A1 | 3/2006 | Gysling |

FOREIGN PATENT DOCUMENTS

| | | |
|---|---|---|
| JP | 2005189003 A | 7/2005 |
| WO | WO-2005/003690 A2 | 1/2005 |
| WO | 2007022052 A1 | 2/2007 |

OTHER PUBLICATIONS

Georges L. Chahine et al. "Development of a Near Real-Time Instrument for Nuclei Measurement: The ABS Acoustic Bubble Specrometer", Proceeding of FEDSM' 03, International Symposium on Cavitation Inception, 4th ASME__JSME Joint Fluids Engineering Conference, Honolulu, Hawaiii, USA, pp. 1-9.

* cited by examiner

VIBRATORY FLOW METER AND METHOD FOR CORRECTING FOR ENTRAINED GAS IN A FLOW MATERIAL

BACKGROUND OF THE INVENTION

1. Field of the Invention

The present invention relates to a vibratory flow meter and method, and more particularly, to a vibratory flow meter and method for correcting for entrained gas in a flow material.

2. Statement of the Problem

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Flow meters are used to perform mass flow rate measurements for a wide variety of fluid flows. One area in which Coriolis flow meters can potentially be used is in the metering of oil and gas wells. The product of such wells can comprise a multiphase flow, including the oil or gas, but also including other components, including water and air, for example. It is highly desirable that the resulting metering be as accurate as possible, even for such multiphase flows.

Coriolis meters offer high accuracy for single phase flows. However, when a Coriolis flow meter is used to measure aerated fluids or fluids including entrained gas, the accuracy of the meter can be significantly degraded. Entrained gas is commonly present as bubbles in the flow material. The size of the bubbles can vary, depending on the amount of gas present, the pressure of the flow material, the temperature, and the degree of mixing in the pipeline. The extent of the decrease in performance is not only related to how much total gas is present, but also to the size of the individual gas bubbles in the flow. The size of the bubbles affects the accuracy of the measurement. Larger bubbles occupy more volume, leading to fluctuations in the density of the flow material. Due to the compressibility of a gas, the bubbles can change in gas amount yet not necessarily change in size. Conversely, if the pressure changes, the bubble size can correspondingly change, expanding as the pressure drops or shrinking as the pressure increases. This can also cause variations in the natural or resonant frequency of the flow meter.

Another problem caused by gas bubbles is slippage. Small bubbles typically move with the liquid flow material as the flow meter is vibrated. However, larger bubbles do not move with the liquid during vibration of the flow tube. Instead, the bubbles can be decoupled from the liquid and can move independently of the liquid. Consequently, the liquid can flow around the bubbles. This adversely affects the vibrational response of the flowmeter.

There remains a need in the art for a vibratory flow meter that detects problematic levels of entrained gas. There remains a need in the art for a vibratory flow meter that can accurately measure flow characteristics in the presence of entrained gas. There remains a need in the art for a vibratory flow meter that can accurately measure flow characteristics at any level of entrained gas.

SUMMARY OF THE INVENTION

A vibratory flow meter for correcting for entrained gas in a flow material is provided according to an embodiment of the invention. The vibratory flow meter comprises a flow meter assembly configured to generate a vibrational response for the flow material, a bubble vibration sensor configured to generate a bubble measurement signal for the flow material, and meter electronics coupled to the flow meter assembly and to the bubble vibration sensor. The meter electronics is configured to receive the vibrational response and the bubble measurement signal, determine a bubble size of bubbles in the flow material using at least the bubble measurement signal, determine one or more flow characteristics of the flow material using at least the vibrational response and the bubble size.

A vibratory flow meter for correcting for entrained gas in a flow material is provided according to an embodiment of the invention. The vibratory flow meter comprises a flow meter assembly configured to generate a vibrational response for the flow material, a bubble vibration sensor configured to generate a bubble measurement signal for the flow material, and meter electronics coupled to the flow meter assembly and to the bubble vibration sensor. The meter electronics is configured to receive the vibrational response and the bubble measurement signal, determine a bubble size of bubbles in the flow material using at least the bubble measurement signal, determine one or more flow characteristics of the flow material using at least the vibrational response, and generate an alarm if the bubble size exceeds a predetermine size threshold, with the alarm indicating that one or more flow characteristics have exceeded a predetermined measurement tolerance.

A method of correcting for entrained gas in a flow material is provided according to an embodiment of the invention. The method comprises determining a bubble size of bubbles in the flow material using at least a vibrational measurement of the flow material, generating a vibrational response by vibrating a flow tube assembly, and determining the one or more flow characteristics using at least the vibrational response and the bubble size.

A method of correcting for entrained gas in a flow material is provided according to an embodiment of the invention. The method comprises determining a bubble size of bubbles in the flow material using at least a vibrational measurement of the flow material, generating a vibrational response by vibrating a flow tube assembly and determining one or more flow characteristics of the flow material using at least the vibrational response, and generating an alarm if the bubble size exceeds a predetermined size threshold, with the alarm indicating that the one or more flow characteristics have exceeded a predetermined measurement tolerance.

ASPECTS OF THE INVENTION

In one aspect of the vibratory flow meter, the bubble size sensor measures a bubble response to a vibration of one or more bubbles in the flow material.

In another aspect of the vibratory flow meter, the bubble size sensor vibrates the flow material and subsequently measures a bubble response to the vibrating.

In yet another aspect of the vibratory flow meter, the bubble size sensor acoustically vibrates the flow material and subsequently measures a bubble response to the vibrating.

In yet another aspect of the vibratory flow meter, the bubble vibration sensor is separate and independent from the flow meter assembly.

In yet another aspect of the vibratory flow meter, the bubble vibration sensor is formed as part of the flow meter assembly.

In yet another aspect of the vibratory flow meter, the bubble vibration sensor comprises at least one pickoff sensor of the flow meter assembly.

In yet another aspect of the vibratory flow meter, determining the bubble size comprises determining the bubble size of a substantially largest bubble in the flow material.

In yet another aspect of the vibratory flow meter, determining the bubble size further comprises determining the bubble size of the bubbles in the flow material that are above a predetermined size threshold.

In yet another aspect of the vibratory flow meter, with the meter electronics being further configured to generate an alarm if the bubble size exceeds a predetermined size threshold, with the alarm indicating that the one or more flow characteristics have exceeded a predetermined measurement tolerance.

In yet another aspect of the vibratory flow meter, further comprising generating a bubble size output.

In yet another aspect of the vibratory flow meter, further comprising generating a change flow conditions indication if the bubble size exceeds the predetermined size threshold.

In yet another aspect of the vibratory flow meter, determining the one or more flow characteristics further comprises determining the one or more flow characteristics using at least the vibrational response and the bubble size only if the bubble size exceeds the predetermined size threshold.

In yet another aspect of the vibratory flow meter, generating the alarm further comprises generating a bubble size output indicating the bubble size.

In yet another aspect of the vibratory flow meter, generating the alarm further comprises generating a bubble size output of a substantially largest bubble in the flow material.

In yet another aspect of the vibratory flow meter, generating the alarm further comprises generating a change flow conditions indication if the bubble size exceeds the predetermined size threshold.

In yet another aspect of the vibratory flow meter, the meter electronics is further configured to determine the one or more flow characteristics using at least the vibrational response and the bubble size.

In one aspect of the method, determining the bubble size comprises determining the bubble size of a substantially largest bubble in the flow material.

In another aspect of the method, determining the bubble size further comprises determining the bubble size of the bubbles in the flow material that are above a predetermined size threshold.

In yet another aspect of the method, the method further comprises generating an alarm if the bubble size exceeds a predetermined size threshold, with the alarm indicating that the one or more flow characteristics have exceeded a predetermined measurement tolerance.

In yet another aspect of the method, further comprising generating a bubble size output.

In yet another aspect of the method, the method further comprises generating a change flow conditions indication if the bubble size exceeds the predetermined size threshold.

In yet another aspect of the method, determining the flow characteristic further comprises determining the one or more flow characteristics using at least the vibrational response and the bubble size only if the bubble size exceeds the predetermined size threshold.

In yet another aspect of the method, generating the alarm further comprises generating a bubble size output.

In yet another aspect of the method, generating the alarm further comprises generating a change flow conditions indication if the bubble size exceeds the predetermined size threshold.

In yet another aspect of the method, the method further comprises determining the one or more flow characteristics using at least the vibrational response and the bubble size.

In yet another aspect of the method, determining the one or more flow characteristics further comprises determining the one or more flow characteristics using at least the vibrational response and the bubble size only if the bubble size exceeds the predetermined size threshold.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
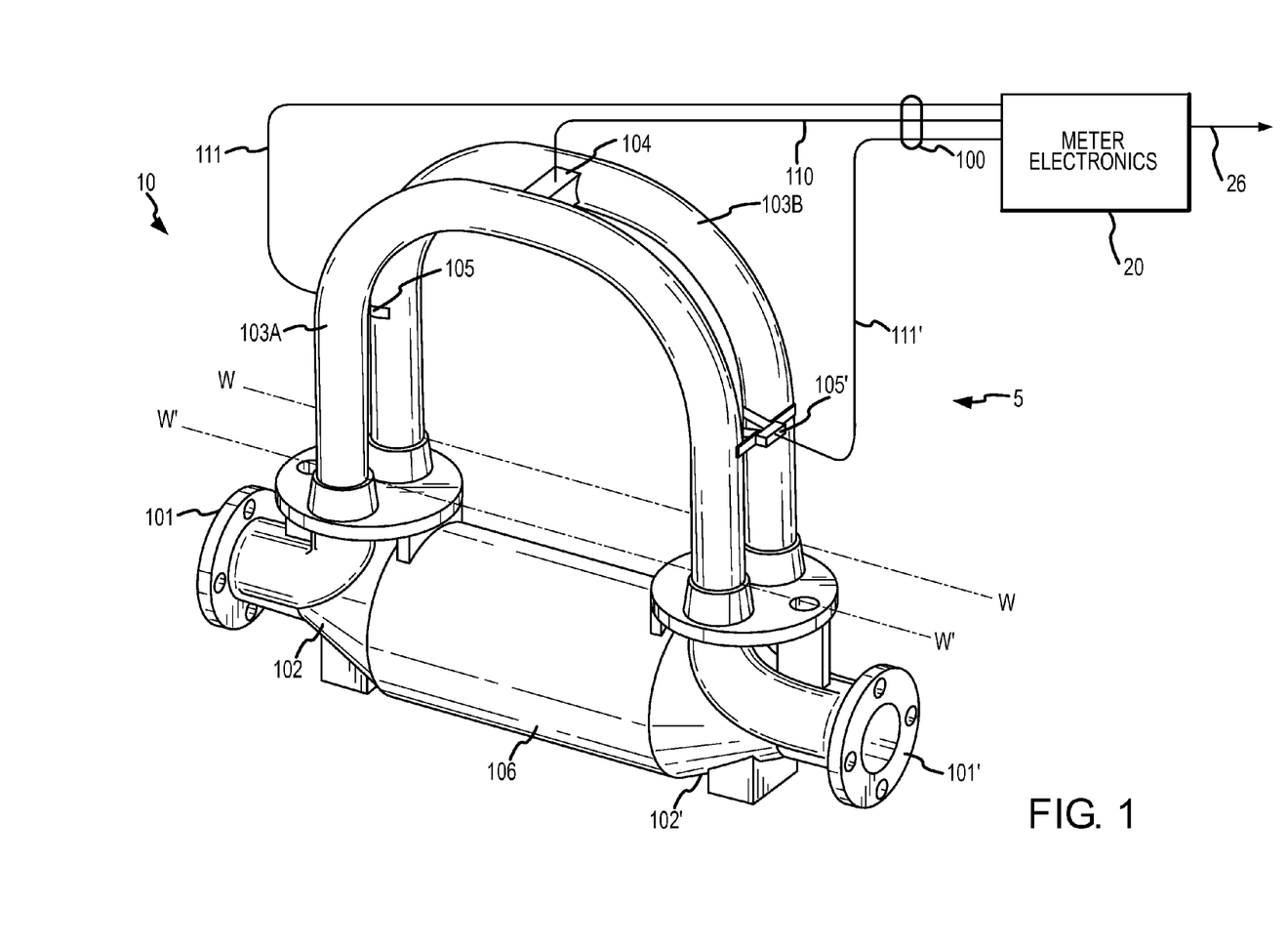
FIG. 1 shows a flow meter comprising a flow meter assembly and meter electronics.

FIG. 1 shows a flow meter 5 comprising a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of Coriolis flow meter regardless of the number of drivers, pick-off sensors, flow conduits, or the operating mode of vibration. In addition, it should be recognized that the flow meter 5 can alternatively comprise a vibratory densitometer.

The flow meter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

In one embodiment, the flowtubes 103A and 103B comprise substantially U-shaped flowtubes, as shown. Alternatively, in other embodiments, the flowtubes can comprise substantially straight flowtubes. However, other shapes can also be used, and are within the scope of the description and claims.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow material being measured, the flow material enters the flow meter assembly 10 through the flange 101, passes through the inlet manifold 102 where the total amount of flow material is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flow meter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a Coriolis flow meter and is not intended to limit the teaching of the present invention.

One common problem in measuring the one or more flow characteristics arises when there is entrained air (or any gas) in the flow material. The entrained gas can be present as bubbles of varying size. When the bubbles are relatively small, they have negligible effect on the flow measurements. However, as the bubble size increases, the error in the flow measurements also increases.

Figure 2:
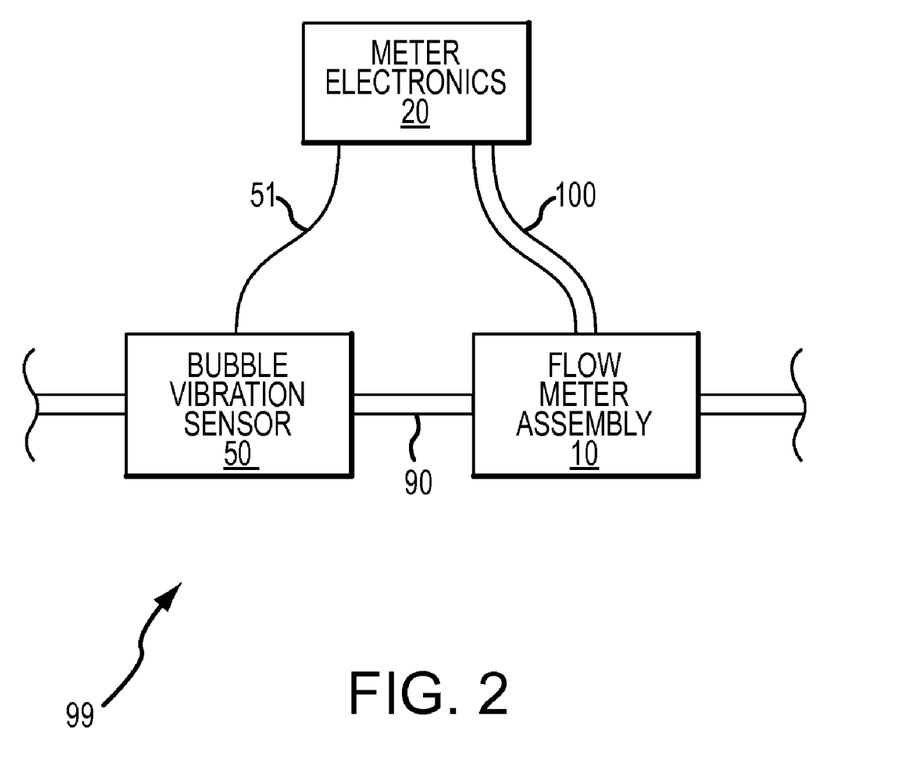
FIG. 2 shows a vibratory flow meter according to an embodiment of the invention.

FIG. 2 shows a vibratory flow meter 99 according to an embodiment of the invention. The vibratory flow meter 99 includes a flow meter assembly 10, a bubble size sensor 50, and meter electronics 20. The meter electronics 20 are coupled to the flow meter assembly 10 by the leads 100. The meter electronics 20 are coupled to the bubble size sensor 50 by one or more leads 51 in the embodiment shown in this figure. The flow meter assembly 10 and the bubble size sensor 50 can be coupled to a conduit 90 that is conducting a flow material. The flow material can comprise a two-phase or multi-phase flow.

The flow meter 99 generates an improved flow characteristic measurement. The flow characteristic measurement is improved in the presence of entrained gas bubbles in the flow material. For example, the flow meter 99 can generate an improved density measurement for a flow material. However, it should be understood that the flow meter 99 can additionally provide a flow rate measurement of the flow material. As a result, the flow meter 99 can comprise a vibrating densitometer and/or a Coriolis flow meter. Other additional flow measurements can be generated and are within the scope of the description and claims.

The meter electronics 20 in one embodiment is configured to vibrate the flowtubes 103A and 103B. The vibration is performed by the driver 104. The meter electronics 20 further receives resulting vibrational signals from the pickoff sensors 105 and 105'. The vibrational signals comprise a vibrational response of the flowtubes 103A and 103B. The meter electronics 20 processes the vibrational response and determines one or more flow characteristics, such as a density, a mass and/or volume flow rate, etc.

The bubble size sensor 50 can comprise an integral part of the vibratory flow meter 99 and can be formed as part of the flow meter assembly 10. Alternatively, the bubble size sensor 50 can comprise a separate component that is separate and independent from the flow meter assembly 10. In another alternative, the bubble size sensor 50 can be part of the flow meter assembly 10 and can comprise at least one pickoff sensor 105 and/or 105' of the flow meter assembly 10.

The bubble size sensor 50 is configured to generate a bubble measurement signal for the flow material. The bubble size sensor 50 can measure a bubble response to a vibration of one or more bubbles in the flow material and generate the bubble measurement signal from the bubble vibrational response. The bubble size sensor 50 can passively detect bubble vibrations. Alternatively, the bubble size sensor 50 can vibrate the flow material and can subsequently measure a bubble response to the vibrating.

The vibrations in some embodiments comprise acoustic vibrations. Alternatively, in other embodiments the vibrations are non-acoustic.

The bubble size sensor 50 in some embodiments comprises an active device that both generates and detects vibrations. The bubble size sensor 50 in this embodiment can vibrate a corresponding flow conduit or flow material and can receive resulting vibrations. The induced vibrations can be analyzed to determine bubble sizes of entrained gas in the flow material. The bubble size sensor 50 can alternatively vibrate the flow directly, such as through a port in a conduit. Alternatively, in other embodiments the bubble size sensor 50 comprises a passive device that merely detects and receives vibrations. The bubble size sensor 50 can detect vibrations of a conduit, including a conduit of the flow meter assembly 10, for example, or can directly detect vibrations of the flow material. The bubble size sensor 50 can receive vibrations generated by the flow of the flow material, wherein the vibrations can be processed in order to determine a bubble size or sizes.

The flow meter assembly 10 is configured to generate a vibrational response for the flow material. The meter electronics 20 can receive and process the bubble measurement signal and the vibrational response in order to determine a bubble size, among other things. The meter electronics 20 can receive and process the bubble measurement signal and the vibrational response in order to determine a bubble size of bubbles in the flow material above a predetermined size threshold. The meter electronics 20 can receive and process the bubble measurement signal and the vibrational response in order to determine a bubble size of a substantially largest bubble in the flow material.

Figure 3:
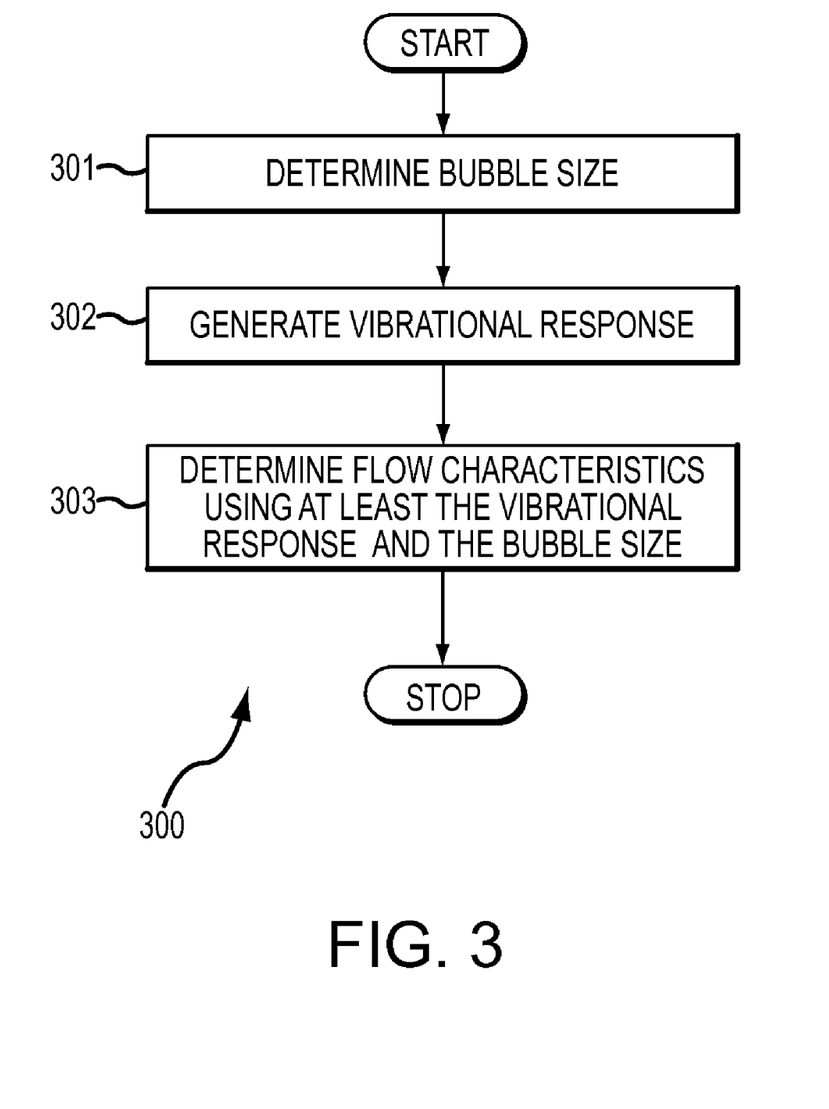
FIG. 3 shows a flowchart of a method of correcting for entrained gas in a flow material in a vibratory flow meter.

The meter electronics 20 can receive and process the bubble measurement signal and the vibrational response in order to determine one or more flow characteristics using at least the vibrational response and the bubble size (see FIG. 3 and the accompanying discussion). Alternatively, the meter electronics 20 can receive and process the bubble measurement signal and the vibrational response in order to generate an alarm if the bubble size exceeds a predetermined size threshold (see FIG. 7 and the accompanying discussion). The alarm can therefore indicate that the flow characteristic has exceeded a predetermined measurement tolerance.

The meter electronics 20 can generate a bubble size output. In some embodiments, the bubble size output comprises a size of one or more bubbles. In some embodiments, the bubble size output comprises a bubble size of a substantially largest bubble in the flow material. The bubble size output can be stored and or transferred to an operator or can be transferred to a remote location or device.

The meter electronics 20 can generate a change flow conditions indication if the bubble size exceeds a predetermined size threshold. The change flow conditions indication can prompt an operator or technician to change flow conditions in the flow meter 99, such as by changing a flow rate, a flow pressure, or other flow conditions.

The meter electronics 20 can determine the one or more flow characteristics based on the bubble size. For example, the bubble size can be correlated to a void fraction value and the mass flow rate or volume flow rate can be adjusted accordingly. In some embodiments, the meter electronics 20 determines the one or more flow characteristics only if the bubble size exceeds a predetermined size threshold.

The fluids model comprises the equations of motion of a spherical particle in an oscillating flow, such as in Clift R., Grace J. R., and Weber M. E., *Bubbles, Drops and Particles*, N.Y., Academic Press, 1978, p. 306-314, incorporated herein by reference. These equations are found by solving the unsteady Stokes equations and then using empirical corrections to the various terms to account for higher Reynolds numbers, as might be found in some Coriolis meter applications.

FIG. 3 shows a flowchart 300 of a method of correcting for entrained gas in a flow material in a vibratory flow meter. In step 301, a bubble size is determined through a bubble size measurement of one or more bubbles in the flow material. A bubble vibration sensor can be used to determine the bubble size. The bubble size can be determined using a vibratory bubble size measurement or an acoustic bubble size measurement, as previously discussed. The bubble size measurement is discussed in detail below, after the discussion of the flowchart 300.

The bubble size in some embodiments comprises an instantaneous bubble size. The bubble size in some embodiments comprises a substantially average bubble size. The bubble size in some embodiments comprises a bubble size measurement of bubbles above a predetermined size threshold. The bubble size in some embodiments comprises a substantially largest bubble size. The substantially largest bubble size can be used because the largest bubbles in the flow material will have the biggest influence and impact on the measured flow characteristics.

In step 302, a vibrational response is generated by vibrating a flow tube assembly. The vibrational response will vary according to the flow of the flow material in the flow tube assembly.

In step 303, one or more flow characteristics are determined using at least the vibrational response and the bubble size. The one or more flow characteristics can include a density of the flow material, for example. The one or more flow characteristics can include a mass flow rate of the flow material, for example. However, other flow characteristics are contemplated and are within the scope of the description and claims.

The determining can provide a high level of accuracy of the one or more flow characteristics. For example, a density measurement has been known to be affected by entrained gas in a liquid flow material, also known as a two phase flow condition, and consequently the density can be more accurately and reliably determined using the bubble size. The bubble size (and optionally a bubble count) can be used to determine a substantially instantaneous gas volume in the flow material. The gas volume can be subtracted from a substantially instantaneous volume flow rate.

In some embodiments, the determining step can be based on a current bubble size. For example, if detected bubbles are not greater than a predetermined size threshold, then the determining can optionally be performed using only the vibrational response. Conversely, when the bubble size exceeds the predetermined size threshold, then the determining step can use at least the vibrational response and the bubble size.

The threshold can be set so that the determining step is done only when bubble size and entrained gas effect becomes significant.

Coriolis meters require that the flow material moves fully with the flowtubes during oscillation. When gas bubbles are introduced, this assumption is no longer valid as there is at least some relative motion, or decoupling, between the two phases. The fluids model for predicting behavior of moving fluids can predict decoupling effects in a Coriolis meter. Further, the fluids model can be used to compensate for entrained gas in the flow material where the bubble size is known.

Bubble size in a pipe or conduit is a complex function of the geometry of the line, the flow rate, and other fluid properties. The exact distribution of bubbles inside the meter can be measured on a real-time basis and the fluids model can be used to compensate for decoupling errors and can enable improvements in entrained gas measurements.

Several companies offer a bubble size measurement based on multiphase flow acoustics, including the ABS Acoustic Bubble Spectrometer from DynaFlow, Inc., of Jessup, Md., and including the StreamTone product from CSIRO Manufacturing & Materials Technology of Clayton, Australia. The measurement principle is very simple. Each bubble oscillates radially at its natural frequency when hit with pressure disturbances in the flow or pressure disturbances from external sources. The oscillation frequency (ω) of the first mode is primarily a function of the size of the bubble as follows:

$$\omega = \frac{1}{a}\sqrt{\frac{3\gamma p}{\rho}} \quad (1)$$

Where the (a) term is the bubble radius, the (ρ) term is the liquid density of the flow material, the (γ) term is the specific heat ratio of the flow material, and the (p) term is the liquid pressure. The measurement comprises exciting a bubble, either with turbulent flow or by active excitation at certain frequencies, and then receiving and analyzing the returned frequencies.

The vibrational bubble size measurement may not be highly accurate or reliable for smaller bubbles. However, it may be desirable to measure only bubbles above a certain size, as the smaller gas bubbles exhibit a negligible effect on the accuracy of the flow meter.

Figure 4:
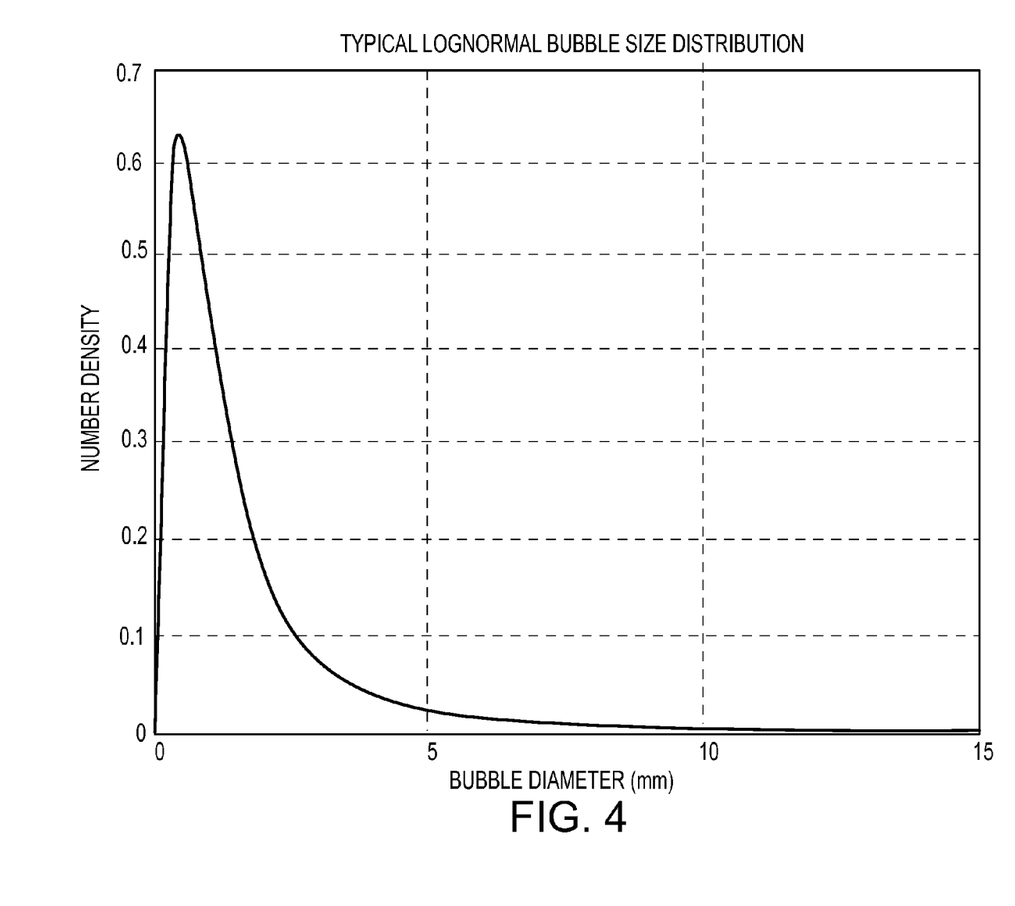
FIG. 4 is a graph of statistical bubble size distribution in a flow material.

FIG. 4 is a graph of a statistical bubble size distribution in a flow material. The bubble distribution in a pipeline is commonly known to be well described by a lognormal distribution, being skewed significantly to the smaller diameters. As will be shown below, this is beneficial because it means that there are only a few large bubbles containing most of the gas volume. As with a normal distribution, the mean and standard deviation must be known to define the shape of the distribution. For the following developments, these parameters represent typical water and gas flows at moderate flow rates.

There are two controlling aspects regarding the decoupling error in a Coriolis flow meter. The meter is affected by the volume of gas in the meter because this volume determines the amount of decoupled fluid when relative motion occurs between the two phases. In other words, the meter doesn't care how many bubbles there are, but rather it is affected by the volume of fluid those bubbles displace. Second, if a give bubble is so small that it does not decouple from the fluid, then it will not cause any errors and does not need to be considered. Only the larger bubbles will matter from a decoupling perspective. The effect of one 5 mm diameter bubble may cause greater error in the meter than hundreds of 0.5 mm bubbles.

From a volume perspective, only the few larger bubbles in the distribution matter because these contain almost all of the total volume. This is intuitive because the volume of a sphere is the cube of its radius.

However, there is another shift to the larger bubble sizes when the actual decoupling predicted by the fluids model is considered. The model predicts that for very small bubble sizes, there will be no decoupling. Thus, for a typical lognormal distribution, which is already skewed to the smaller sizes, many of the bubbles in the distribution will be completely locked in step with the fluid and will cause no error in mass flow or density measurements.

It has been found that bubble size corresponds to an oscillation frequency of the bubble. Consequently, bubble size can be determined by detecting a vibrational response. If only the largest sized, most significant bubbles in the flow are desired to be found, then a relatively low frequency signal somewhere in the 800-2,000 Hz range should be examined. This is well above most of the vibration due to pumps and other components. As a result, the received vibrational response can be examined for a drastic increase in received signal somewhere between 800-2,000 Hz, which would represent the large bubbles in the flow.

Assuming the characteristics of the liquid are known and the sizes of the bubbles in the meter are known, the amount of relative motion (i.e., decoupling) occurring in the meter can be calculated. Consequently, it can be determined how much farther each bubble is traveling than the liquid, indicating exactly how much fluid is displaced back the other direction in response to the motion of the bubble. This leads directly to a determination of density error and void fraction through a simple equation. The method comprises a center of gravity approach. It should be understood that other methods are contemplated and are within the scope of the description and claims.

Figure 5:
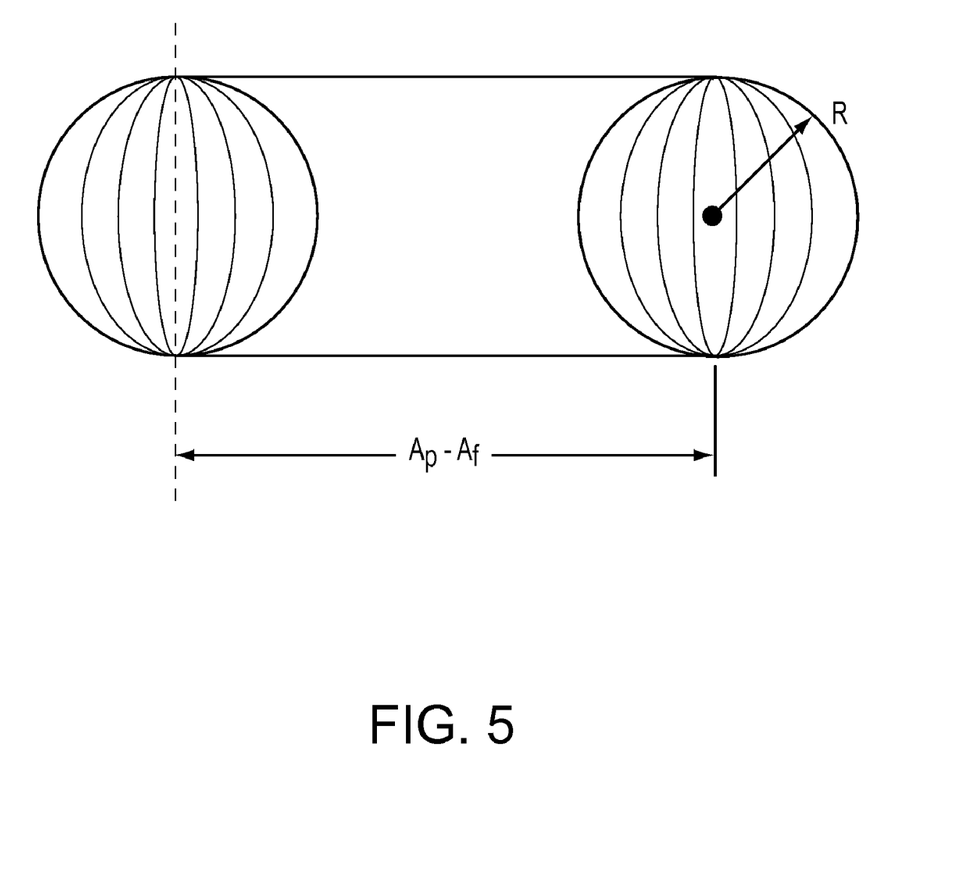
FIG. 5 shows a bubble of radius R moving with respect to a fluid flow material.

FIG. 5 shows a bubble of radius R moving with respect to a fluid flow material. The bubble comprises a spherical body in a fluid medium. The fluid medium is oscillating in synchronization with the flowtube. The particle has a radius R and moves a total distance of ($A_p$) with each oscillation of the tube from zero to peak. The point of interest is how far the bubble travels through the fluid, and not its absolute motion with respect to a laboratory frame of reference. This relative motion can be defined as ($A_p - A_f$) where ($A_f$) is the amplitude of the continuous fluid medium. The fluid amplitude ($A_f$) is essentially the amplitude of the flowtube vibration, a known quantity.

The figure shows a bubble moving from the midline of the tube motion (the left position in the figure) to the maximum amplitude of vibration to one side. The total volume affected by the particle moving from zero to peak amplitude through the fluid is:

$$VolumeAffected = (A_p - A_f)(\pi R^2) + \frac{4}{3}\pi R^3 \quad (2)$$

However, the actual volume of liquid that moves does not include the volume of the gas bubble. Only the volume of liquid that moves during flowtube vibration is of concern, and this is given as:

$$VolumeDisplaced = (A_p - A_f)(\pi R^2) \quad (3)$$

Using this volume and the above figure, it can be seen that a center of gravity analysis can be employed to find the average displacement of the fluid in the path of the bubble. The equation for the center of gravity of the displaced fluid before the bubble moves from zero to peak ($\overline{X}_{before}$) is:

$$\overline{X}_{before} = \frac{2}{3}R + \frac{1}{2}(A_p - A_f) \quad (4)$$

The equation for the center of gravity of the displaced fluid after the bubble moves from zero to peak ($\overline{X}_{after}$) is:

$$\overline{X}_{after} = -\frac{2}{3}R + \frac{1}{2}(A_p - A_f) \quad (5)$$

Thus, a volume of ($\pi R^2(A_p - A_f)$) moves an average distance of ($-4/3 R$) for each oscillation of the tube from zero to peak displacement.

Figure 6:
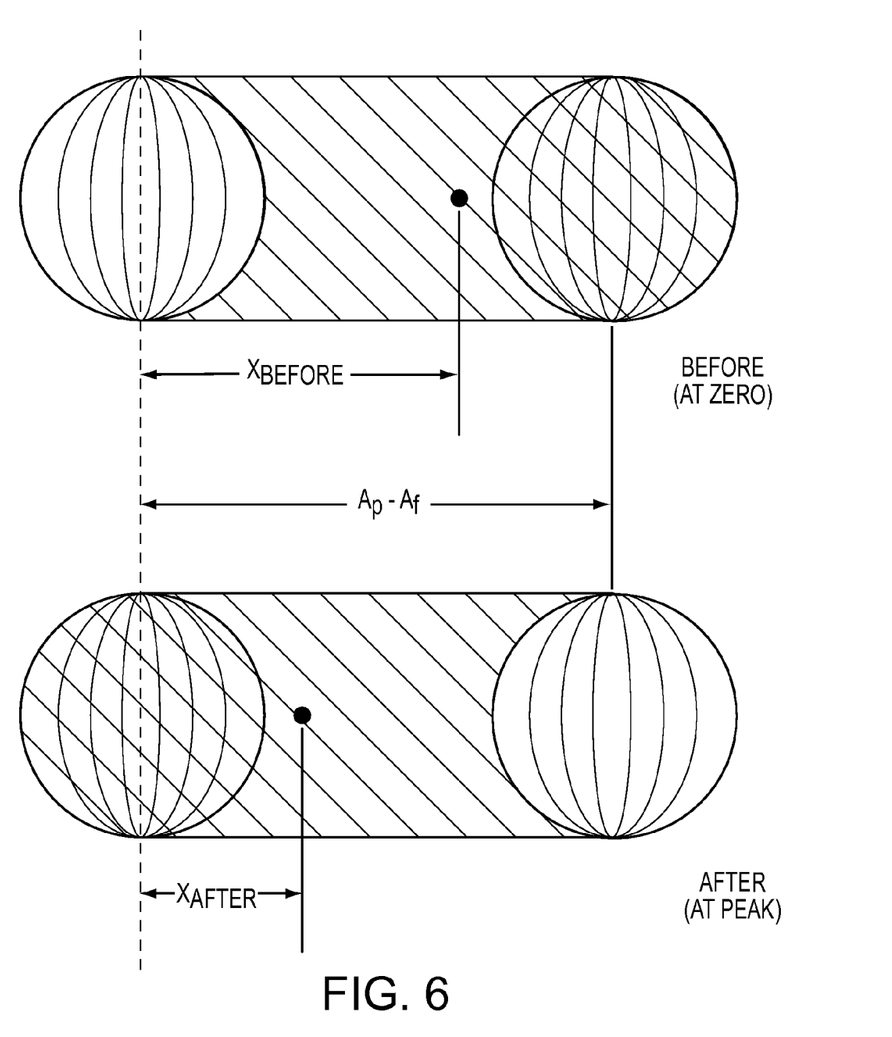
FIG. 6 shows the displaced fluid volume and the bubble before and after slippage in the fluid flow material.

FIG. 6 shows the displaced fluid volume and the bubble before and after slippage in the fluid flow material. The (X) term is the center of gravity of the displaced fluid volume. The figure shows the shift in the center of gravity (X) due to the slippage. The shift in the center of gravity (X) occurs in opposition to the vibration of the flowtube.

However, knowing the amount of fluid that moves backward is not useful for determining the effect on the density measurement. Instead, what is needed is the equivalent volume that would move backward the same distance as the tube moves forward in order to produce the same change in the center of gravity. It can then be assumed that this volume is not participating in the tube oscillation and the mass contained in the volume will be absent from the density measurement. This comprises a conservation of volume calculation, assuming that the bubble does not change in volume during the oscillation. The following calculation finds the non-participating volume.

$$X_{calculated} \mathcal{V}_{calculated} = (-A_f) \mathcal{V}_{non-participating} \quad (6)$$

Or:

$$\left(-\frac{4}{3}R\right)[\pi R^2 (A_p - A_f)] = (-A_f) \mathcal{V}_{non-participating} \quad (7)$$

The non-participating volume comprises the particle volume multiplied by a ratio of the relative particle displacement to the tube displacement. Summing over all particles in the tube, the result can be stated in terms of void fraction ($\Gamma$):

$$\mathcal{V}_{non-participating} = \frac{4}{3}\pi R^3 \left(\frac{A_p - A_f}{A_f}\right) \quad (8)$$

Or:

$$\mathcal{V}_{non-participating} = \Gamma\left(\frac{A_p - A_f}{A_f}\right) \quad (9)$$

The result reflects a gaseous sphere moving to the right ($A_p - A_f$) and a liquid sphere moving the same distance to the left. The same methods and equations can further be used to derive the non-participating volume.

Equations for the actual density ($\rho_{actual}$) and the density with decoupling ($\rho_{decoupled}$) can be established as follows:

$$\rho_{actual} = \rho_f(1 - \Gamma) + \rho_p \Gamma \quad (10)$$

$$\rho_{decoupled} = \rho_f(1 - \Gamma) + \rho_p \Gamma - \rho_f \Gamma \left(\frac{A_p - A_f}{A_f}\right) \quad (11)$$

Density error can be calculated as the difference between the decoupled density and the actual density divided by the actual density:

$$\rho_{error} = \frac{\rho_{decoupled} - \rho_{actual}}{\rho_{actual}} = \frac{\rho_f \Gamma}{\rho_f(\Gamma - 1) - \rho_p \Gamma}\left(\frac{A_p - A_f}{A_f}\right) \quad (12)$$

This equation directly gives density error as long as the relative motion of the particles, i.e., the $A_p$ terms, are known from the fluids model. The bubble size measurement and the known flow material fluid characteristics provide the information needed for the fluids model. With this information, the meter's density output can be corrected. In addition, the information can further be used to determine the void fraction $\Gamma$, as the actual liquid density is already known from the flow material fluid characteristics.

The use of a bubble size measurement provides a completely independent measurement which can be used to detect the presence of gas in a very robust way. The technique not only enables detection of the gas, but can provide an estimate how much the entrained gas affects the flow measurements.

Figure 7:
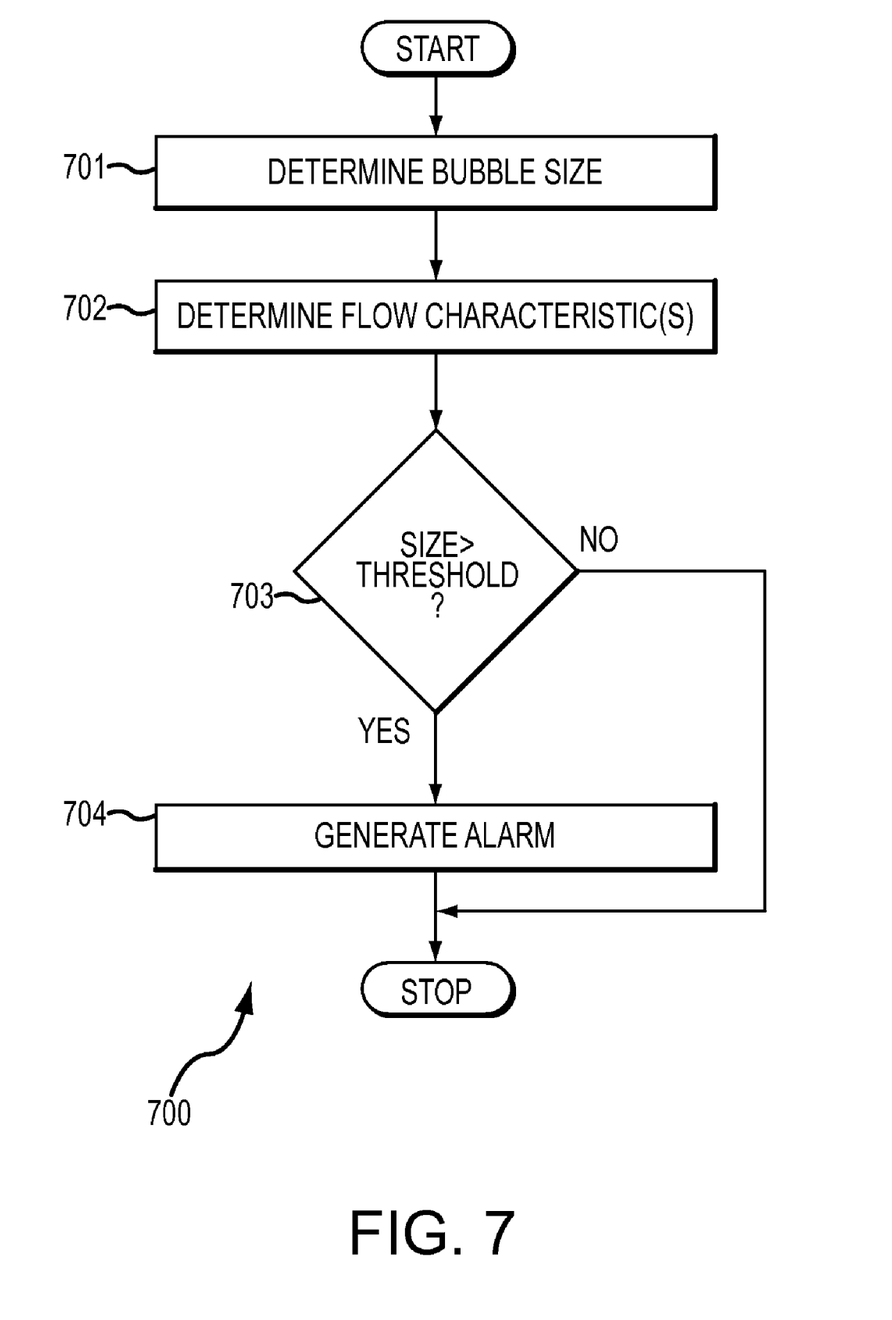
FIG. 7 shows a flowchart of a method of correcting for entrained gas in a flow material in a vibratory flow meter.

FIG. 7 shows a flowchart 700 of a method of correcting for entrained gas in a flow material in a vibratory flow meter. In step 701, a bubble size is determined, as previously discussed.

In step 702, a vibrational response is generated by vibrating a flow tube assembly. One or more flow characteristics of the flow material are determined using at least the vibrational response. The determining can further include using the bubble size.

In step 703, the bubble size is compared to a predetermined size threshold. The predetermined size threshold in some embodiments can comprise an acceptable entrained gas threshold. If the bubble size is less than or equal to the predetermined size threshold, then the bubble size is acceptable and the method branches around step 704 and exits. If the bubble size is greater than the predetermined size threshold, then the bubble size is unacceptable and the method proceeds to step 704.

In step 704, an alarm is generated. The alarm indicates that the one or more flow characteristics have exceeded a predetermined measurement tolerance. For example, if the bubbles are too large, then a density measurement of the flow material can be adversely impacted and can be unacceptably accurate due to entrained gas. Other flow characteristics can also be degraded by the entrained gas.

Generating the alarm can include setting an alarm condition in the meter electronics 20. Generating the alarm can include transferring an alarm condition or indication to other devices, such as to a monitoring system. Generating the alarm can include generating any manner of visual or audio alarm.

Generating the alarm can further include transferring, displaying, or otherwise indicating the bubble size, such as generating a bubble size output. The bubble size can comprise a largest bubble size. Alternatively, the bubble size output can comprise a representative bubble size or an average bubble size.

In some embodiments, generating the alarm can further comprise generating a mixing indication that indicates a need for changing the flow conditions. In some embodiments, generating the alarm can further comprise changing the flow conditions. For example, a flow material pressure can be increased in order to decrease the entrained gas error. An increased pressure can reduce the bubble size. Alternatively, the flow rate can be increased in order to break bubbles apart and provide a mixing action. In another alternative, a mixing action can be initiated in order to break up bubbles or otherwise reduce bubble sizes. The mixing indication can prompt a change in flow conditions in order to break up bubbles or otherwise reduce bubble sizes.

Figure 8:
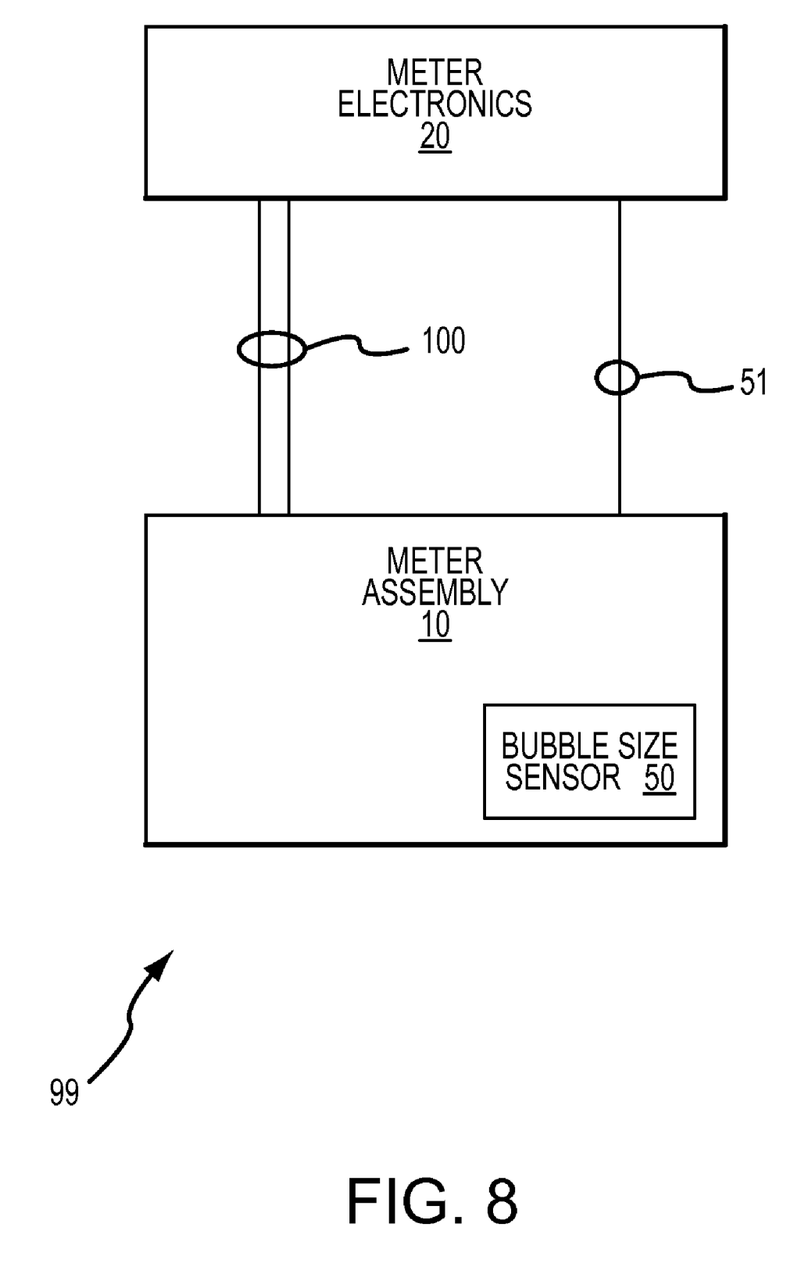
FIG. 8 shows a vibratory flow meter according to an embodiment of the invention.

FIG. 8 shows a vibratory flow meter 99 according to an embodiment of the invention. The vibratory flow meter 99 in this embodiment includes the meter electronics 20 and the meter assembly 10. The meter assembly 10 comprises the flowtubes 103A and 103B, the driver 104, and the pickoff sensors 105 and 105'. The meter assembly 10 is coupled to the meter electronics 20 by the leads 100, as before. In addition, the bubble size sensor 50 can comprise a portion of the flow meter assembly 10 and can be coupled to the meter electronics 20 by the link 51. The bubble size sensor 50 of this embodiment can be located anywhere on the flow meter assembly 10 or alternatively can extend into a flowtube of the flow meter assembly 10. In some embodiments, the bubble size sensor 50 can comprise a vibration pickup or sensor attached to or part of a flow conduit.

Figure 9:
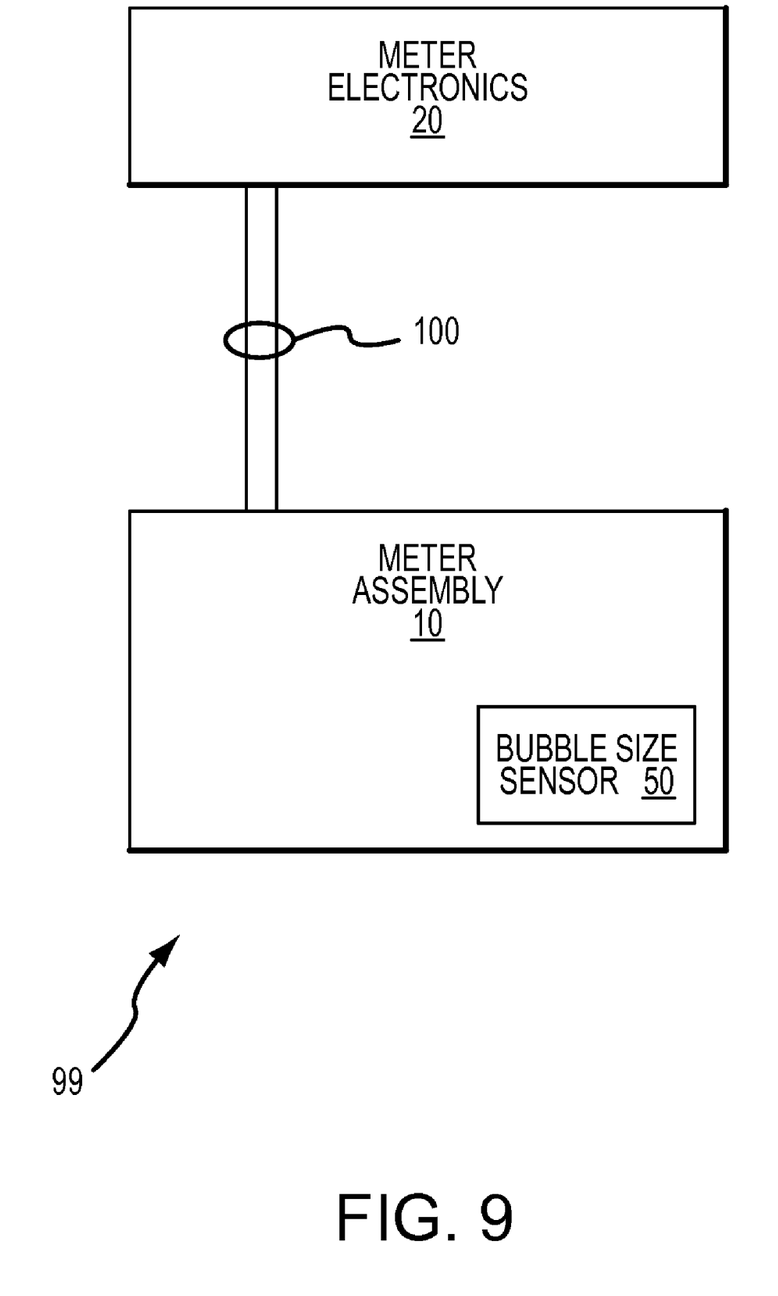
FIG. 9 shows a vibratory flow meter according to an embodiment of the invention.

FIG. 9 shows a vibratory flow meter 99 according to an embodiment of the invention. The vibratory flow meter 99 in this embodiment employs one of the pickoff sensors 105 as both a pickoff sensor and as a bubble size sensor 50. Consequently, the flow meter assembly 10 is coupled to the meter electronics 20 by the leads 100. The leads 100 communicate both the vibrational response and the bubble size measurement.

The vibratory flow meter and method according to the invention can be employed according to any of the embodiments in order to provide several advantages, if desired. The vibratory flow meter and method can be employed to determine accurate flow characteristics. The vibratory flow meter and method can be employed to determine one or more measured flow characteristics when entrained gas is present in the flow material. The vibratory flow meter and method can be employed to determine the flow characteristics obtained from a flow meter assembly only if the bubble size exceeds a size threshold.

The vibratory flow meter and method can be employed to determine a bubble size. The vibratory flow meter and method can be employed to determine a bubble volume. The vibratory flow meter and method can be employed to determine an amount of entrained gas, including a volume of entrained gas. The vibratory flow meter and method can be employed to determine a void fraction in the flow material.

The vibratory flow meter and method can be employed to determine bubbles larger than a critical size. The vibratory flow meter and method can be employed to determine the volume of critical bubbles. The vibratory flow meter and method can be employed to generate an alarm if the bubble size exceeds a size threshold. The vibratory flow meter and method can be employed to generate a bubble size output. The vibratory flow meter and method can be employed to generate a change flow conditions indication if the bubble size exceeds a size threshold.

What is claimed is:

1. A vibratory flow meter (100) for correcting for entrained gas in a flow material, comprising:
   a flow meter assembly (10) configured to generate a vibrational response for the flow material;
   a bubble size sensor (50) configured to generate a bubble measurement signal for the flow material; and
   meter electronics (20) coupled to the flow meter assembly (10) and to the bubble size sensor (50) and configured to receive the vibrational response and the bubble measurement signal, determine a bubble size of bubbles in the flow material using at least the bubble measurement signal, determine one or more flow characteristics of the flow material using at least the vibrational response and the bubble size.

2. The vibratory flow meter (100) of claim 1, with the bubble size sensor (50) measuring a bubble response to a vibration of one or more bubbles in the flow material.

3. The vibratory flow meter (100) of claim 1, with the bubble size sensor (50) vibrating the flow material and subsequently measuring a bubble response to the vibrating.

4. The vibratory flow meter (100) of claim 1, with the bubble size sensor (50) acoustically vibrating the flow material and subsequently measuring a bubble response to the vibrating.

5. The vibratory flow meter (100) of claim 1, with the bubble size sensor (50) being separate and independent from the flow meter assembly (10).

6. The vibratory flow meter (100) of claim 1, with the bubble size sensor (50) being formed as part of the flow meter assembly (10).

7. The vibratory flow meter (100) of claim 1, with the bubble size sensor (50) comprising at least one pickoff sensor (105) of the flow meter assembly (10).

8. The vibratory flow meter (100) of claim 1, with determining the bubble size comprising determining the bubble size of a large bubble in the flow material.

9. The vibratory flow meter (100) of claim 1, with determining the bubble size further comprising determining the bubble size of the bubbles in the flow material that are above a predetermined size threshold.

10. The vibratory flow meter (100) of claim 1, with the meter electronics (20) being further configured to generate an alarm if the bubble size exceeds a predetermined size threshold, with the alarm indicating that the one or more flow characteristics have exceeded a predetermined measurement tolerance.

11. The vibratory flow meter (100) of claim 1, further comprising generating a bubble size output.

12. The vibratory flow meter (100) of claim 1, further comprising generating a change flow conditions indication if the bubble size exceeds a predetermined size threshold.

13. The vibratory flow meter (100) of claim 1, with determining the one or more flow characteristics further comprising determining the one or more flow characteristics using at least the vibrational response and the bubble size only if the bubble size exceeds a predetermined size threshold.

14. A vibratory flow meter (100) for correcting for entrained gas in
   a flow material, comprising:
   a flow meter assembly (10) configured to generate a vibrational response for the flow material; a bubble size sensor (50) configured to generate a bubble measurement signal for the flow material; and meter electronics (20) coupled to the flow meter assembly (10) and to the bubble size sensor (50) and configured to receive the vibrational response and the bubble measurement signal, determine a bubble size of bubbles in the flow material using at least the bubble measurement signal, determine one or more flow characteristics of the flow material using at least the vibrational response, and generate an alarm if the bubble size exceeds a predetermined size threshold, with the alarm indicating that one or more flow characteristics have exceeded a predetermined measurement tolerance.

15. The vibratory flow meter (100) of claim 14, with the bubble size sensor (50) measuring a bubble response to a vibration of one or more bubbles in the flow material.

16. The vibratory flow meter (100) of claim 14, with the bubble size sensor (50) vibrating the flow material and subsequently measuring a bubble response to the vibrating.

17. The vibratory flow meter (100) of claim 14, with the bubble size sensor (50) acoustically vibrating the flow material and subsequently measuring a bubble response to the vibrating.

18. The vibratory flow meter (100) of claim 14, with the bubble size sensor (50) being separate and independent from the flow meter assembly (10).

19. The vibratory flow meter (100) of claim 14, with the bubble size sensor (50) being formed as part of the flow meter assembly (10).

20. The vibratory flow meter (100) of claim 14, with the bubble size sensor (50) comprising at least one pickoff sensor (105) of the flow meter assembly (10).

21. The vibratory flow meter (100) of claim 14, with determining the bubble size comprising determining the bubble size of a large bubble in the flow material.

22. The vibratory flow meter (100) of claim 14, with determining the bubble size further comprising determining the bubble size of the bubbles in the flow material that are above a predetermined size threshold.

23. The vibratory flow meter (100) of claim 14, with generating the alarm further comprising generating a bubble size output.

24. The vibratory flow meter (100) of claim 14, with generating the alarm further comprising generating a change flow conditions indication if the bubble size exceeds the predetermined size threshold.

25. The vibratory flow meter (100) of claim 14, with the meter electronics (20) being further configured to determine the one or more flow characteristics using at least the vibrational response and the bubble size.

26. The vibratory flow meter (100) of claim 25, with determining the one or more flow characteristics further comprising determining the one or more flow characteristics using at least the vibrational response and the bubble size only if the bubble size exceeds the predetermined size threshold.

27. A method of correcting for entrained gas in a flow material in a vibratory flow meter, the method comprising:
   determining a bubble size of bubbles in the flow material using at least a vibrational measurement of the flow material;
   generating a vibrational response by vibrating a flow tube assembly; and
   determining one or more flow characteristics using at least the vibrational response and the bubble size.

28. The method of claim 27, with determining the bubble size comprising determining the bubble size of a large bubble in the flow material.

29. The method of claim 27, with determining the bubble size further comprising determining the bubble size of the bubbles in the flow material that are above a predetermined size threshold.

30. The method of claim 27, further comprising generating an alarm if the bubble size exceeds a predetermined size threshold, with the alarm indicating that the one or more flow characteristics have exceeded a predetermined measurement tolerance.

31. The method of claim 27, further comprising generating a bubble size output.

32. The method of claim 27, further comprising generating a change flow conditions indication if the bubble size exceeds a predetermined size threshold.

33. The method of claim 27, with determining the flow characteristic further comprising determining the one or more flow characteristics using at least the vibrational response and the bubble size only if the bubble size exceeds a predetermined size threshold.

34. A method of correcting for entrained gas in a flow material in a vibratory flow meter, the method comprising:
   determining a bubble size of bubbles in the flow material using at least a vibrational measurement of the flow material;
   generating a vibrational response by vibrating a flow tube assembly and determining one or more flow characteristics of the flow material using at least the vibrational response; and
   generating an alarm if the bubble size exceeds a predetermined size threshold, with the alarm indicating that the one or more flow characteristics have exceeded a predetermined measurement tolerance.

35. The method of claim 34, with determining the bubble size comprising determining the bubble size of a large bubble in the flow material.

36. The method of claim 34, with determining the bubble size further comprising determining the bubble size of the bubbles in the flow material that are above the predetermined size threshold.

37. The method of claim 34, with generating the alarm further comprising generating a bubble size output.

38. The method of claim 34, with generating the alarm further comprising generating a change flow conditions indication if the bubble size exceeds the predetermined size threshold.

39. The method of claim 34, further comprising determining the one or more flow characteristics using at least the vibrational response and the bubble size.

40. The method of claim 39, with determining the one or more flow characteristics further comprising determining the one or more flow characteristics using at least the vibrational response and the bubble size only if the bubble size exceeds the predetermined size threshold.

* * * * *